US012613758B2

(12) United States Patent
Ha

(10) Patent No.: US 12,613,758 B2
(45) Date of Patent: Apr. 28, 2026

(54) METHOD, COMPUTING DEVICE AND COMPUTER PROGRAM FOR DETECTING ABNORMAL BEHAVIOR OF PROCESS EQUIPMENT

(71) Applicant: AIBIZ Co., Ltd., Seoul (KR)

(72) Inventor: Seung Jae Ha, Seoul (KR)

(73) Assignee: AIBIZ Co., Ltd., Seoul (KR)

( * ) Notice: Subject to any disclaimer, the term of this patent is extended or adjusted under 35 U.S.C. 154(b) by 775 days.

(21) Appl. No.: 18/058,020

(22) Filed: Nov. 22, 2022

(65) Prior Publication Data

US 2024/0103950 A1     Mar. 28, 2024

(30) Foreign Application Priority Data

Sep. 27, 2022   (KR) ........................ 10-2022-0122558

(51) Int. Cl.
*G06F 11/07* (2006.01)
*G06N 3/091* (2023.01)

(52) U.S. Cl.
CPC ........ *G06F 11/076* (2013.01); *G06F 11/0721* (2013.01); *G06N 3/091* (2023.01)

(58) Field of Classification Search
CPC ... G06F 11/076; G06F 11/0721; G06N 3/091; G06N 3/042; G06N 3/084; G06N 3/088; G06N 3/0455; G06N 3/0464; G06N 3/08; G05B 23/0243; G05B 19/418; G05B 23/0221; G05B 23/0224; G05B 23/0262; Y02P 90/02
See application file for complete search history.

(56) References Cited

U.S. PATENT DOCUMENTS

| | | | | |
|---|---|---|---|---|
| 2020/0104639 A1* | 4/2020 | Didari | ...................... | G06N 3/045 |
| 2020/0243359 A1* | 7/2020 | Hao | ................... | H01J 37/32889 |

FOREIGN PATENT DOCUMENTS

| | | |
|---|---|---|
| CN | 114298095 A | 4/2022 |
| CN | 114936532 A | 8/2022 |
| JP | 2016-045861 A | 4/2016 |
| JP | 2018-112852 A | 7/2018 |
| JP | 2021-002335 A | 1/2021 |
| KR | 10-1909836 B1 | 10/2018 |

(Continued)

OTHER PUBLICATIONS

An Office Action mailed by the Korean Intellectual Property Office on Dec. 19, 2022, which corresponds to Korean Patent Application No. 10-2022-0122558 and is related to U.S. Appl. No. 18/058,020.

(Continued)

*Primary Examiner* — Charles R Kasenge
(74) *Attorney, Agent, or Firm* — Studebaker Brackett PLLC

(57) ABSTRACT

Provided is a method of detecting abnormal behavior of process equipment. The method may include obtaining process sensor data and prior knowledge data corresponding to the process sensor data, generating reconstruction process sensor data, which corresponds to the process sensor data, using a deep learning model, calculating a reconstruction rate error on the basis of the process sensor data and the reconstruction process sensor data, and detecting abnormal behavior on the basis of a comparison between the reconstruction rate error and a reference threshold.

8 Claims, 8 Drawing Sheets

(56)                    References Cited

FOREIGN PATENT DOCUMENTS

| KR | 10-2182226 B1 | 11/2020 |
| KR | 10-2020-0141812 A | 12/2020 |
| TW | 202024827 A | 7/2020 |
| TW | 202122946 A | 6/2021 |

OTHER PUBLICATIONS

Ailin Deng et al., "Graph Neural Network-Based Anomaly Detection in Multivariate Time Series", AAAI Conference on Artificial Intelligence (AAAI-21), Jun. 13, 2021, arxiv.org/abs/2106.06947v1 [cs.LG], 9 pages total.

An Office Action mailed by Taiwan Intellectual Property Office on Jun. 5, 2024, which corresponds to Taiwanese U.S. Appl. No. 18/058,020 and is related to U.S. Appl. No. 18/058,020.

An Office Action issued by Taiwan Intellectual Property Office on Mar. 21, 2023, which corresponds to Taiwanese U.S. Appl. No. 18/058,020 and is related to U.S. Appl. No. 18/058,020.

A Notice of Allowance mailed by the Korean Intellectual Property Office on Apr. 10, 2023, which corresponds to Korean Patent Application No. 10-2022-0122558 and is related to U.S. Appl. No. 18/058,020.

\* cited by examiner

FIG. 3

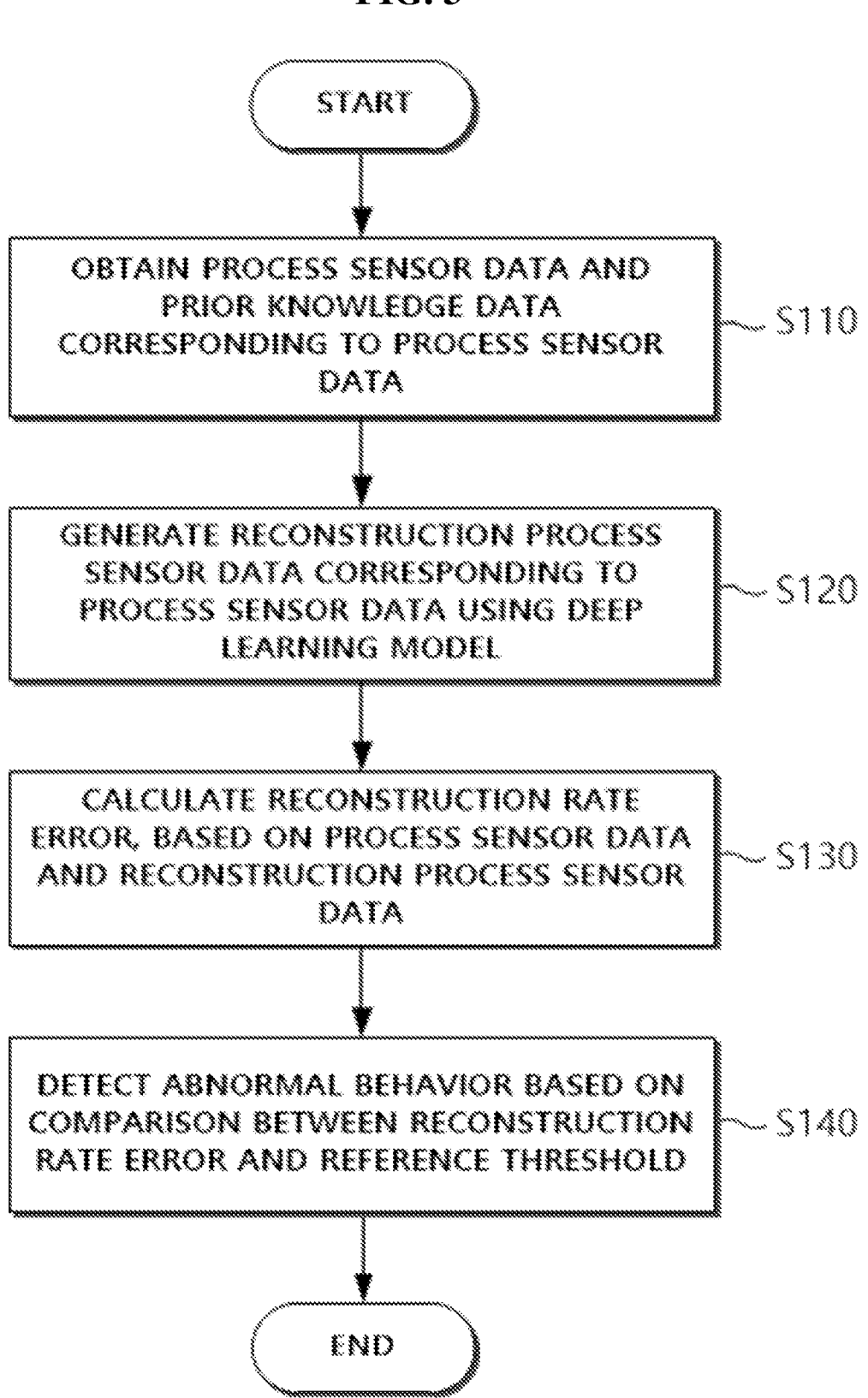

START

OBTAIN PROCESS SENSOR DATA AND PRIOR KNOWLEDGE DATA CORRESPONDING TO PROCESS SENSOR DATA ~ S110

GENERATE RECONSTRUCTION PROCESS SENSOR DATA CORRESPONDING TO PROCESS SENSOR DATA USING DEEP LEARNING MODEL ~ S120

CALCULATE RECONSTRUCTION RATE ERROR, BASED ON PROCESS SENSOR DATA AND RECONSTRUCTION PROCESS SENSOR DATA ~ S130

DETECT ABNORMAL BEHAVIOR BASED ON COMPARISON BETWEEN RECONSTRUCTION RATE ERROR AND REFERENCE THRESHOLD ~ S140

END

METHOD, COMPUTING DEVICE AND COMPUTER PROGRAM FOR DETECTING ABNORMAL BEHAVIOR OF PROCESS EQUIPMENT

CROSS-REFERENCE TO RELATED APPLICATION

This application claims priority to and the benefit of Korean Patent Application No. 10-2022-0122558, filed on Sep. 27, 2022, the disclosure of which is incorporated herein by reference in its entirety.

BACKGROUND

1. Field of the Invention

The present disclosure relates to identifying abnormal behavior of process equipment, and more particularly, to detecting whether abnormal behavior has occurred in a process by analyzing sensor process data, which is obtained in time series in the process, using artificial intelligence (AI).

2. Discussion of Related Art

Generally, in a factory with a mass-production system, a manufacturing process is divided into several sub-processes for specialization to increase mass production efficiency, and automation equipment suitable for each of the sub-processes is operated.

In the automation equipment, the process may be performed abnormally due to a fault of the equipment or a surrounding environment while the same process is repeatedly performed. In a manufacturing process system in which processes are consecutively performed and organically connected to each other, a failure in the entire process and poor-quality products may be caused when an abnormality occurs in equipment for some of the processes. Accordingly, it is very important to periodically detect an abnormality in factory equipment operated for each process in terms of maintenance of the factory mass-production system.

A skilled operator can detect an abnormality in factory equipment by frequently checking an operating state of the equipment on the basis of various types of sensor process data. However, there is a limit for even a skilled operator to completely check a large amount of sensor process data generated in real time to accurately detect fault data (or abnormality data), and a lot of time may be required for an abnormality data detection process. As factory equipment becomes complicated due to the introduction of a factory automation (FA) system, the amount of knowledge and know-how required for operators become very large, thus making it difficult for inexperienced operators to identify a cause of an abnormal state.

Meanwhile, with the accumulation of sensor process data to be used temporarily or stored in a database to be used permanently, research is being conducted on automated processing of monitoring data of industrial equipment related to various fields. In particular, as the amount of information to be processed increases due to the development of computer technology, artificial intelligence (AI) is rapidly evolving and thus research and development is being conducted on technologies for detecting an abnormality in data using AI.

PRIOR ART LITERATURE

Patent Document

Korean Registered Patent No. 10-1909836

SUMMARY OF THE INVENTION

To address the problems of the background art described above, the present disclosure is directed to detecting abnormal behavior in a process by analyzing sensor process data, which is obtained in time series in the process, using artificial intelligence (AI).

Aspects of the present disclosure are not limited thereto and other aspects not mentioned herein will be apparent to those of ordinary skill in the art from the following description.

Provided is a method of detecting abnormal behavior of process equipment according to various embodiments of the present disclosure to solve the above-described problems. The method may include obtaining process sensor data and prior knowledge data corresponding to the process sensor data, generating reconstruction process sensor data, which corresponds to the process sensor data, using a deep learning model, calculating a reconstruction rate error on the basis of the process sensor data and the reconstruction process sensor data, and detecting abnormal behavior on the basis of a comparison between the reconstruction rate error and a reference threshold.

In an alternative embodiment, the process sensor data may be sensor data obtained in real time through a plurality of sensors on the basis of the operation of semiconductor process equipment and may include a plurality of pieces of sensor data related to normal behavior, and the prior knowledge data may include relationship information between the plurality of sensors.

In an alternative embodiment, the deep learning model may be a model configured to generate feature information corresponding to the process sensor data, restore the generated feature information, and output the reconstruction process sensor data, when the process sensor data is input thereto, and may be a neural network model trained to minimize an error between the process sensor data and the reconstruction process sensor data.

In an alternative embodiment, the deep learning model may include a first sub-model configured to output feature information corresponding to the process sensor data, a second sub-model configured to extract interrelationship information between pieces of the process sensor data on the basis of the process sensor data and the prior knowledge data, an attention module configured to generate feature information by combining outputs of the first sub-model and the second sub-model, and a dimension restoration model configured to generate the reconstruction process sensor data by restoring the feature information.

In an alternative embodiment, the second sub-model may be a graph neural network (GNN) model configured to analyze data related to a dynamic graph structure that changes over time to extract relationship information.

In an alternative embodiment, the attention module may generate relationship information between time steps of the first sub-model and the second sub-model and combine outputs related to the same time step.

In an alternative embodiment, the reference threshold may be determined on the basis of a reconstruction rate error related to a maximum value among a plurality of reconstruction rate errors related to a plurality of pieces of training data in a training process of the deep learning model using the plurality of pieces of training data.

In an alternative embodiment, the detecting of the abnormal behavior on the basis of the comparison between the reconstruction rate error and a reference threshold may include determining that normal behavior has occurred when the reconstruction rate error is equal to or less than the reference threshold, and determining that abnormal behavior has occurred when the reconstruction rate error is greater than the reference threshold.

In another embodiment of the present disclosure, a computing device for detecting abnormal behavior of process equipment is provided. The computing device may include a memory storing one or more instructions, and a processor configured to execute the one or more instructions stored in the memory, and the processor may execute the one or more instructions to perform the method of detecting the abnormal behavior of process equipment.

In another embodiment of the present disclosure, a computer program for detecting abnormal behavior of process equipment is provided. The computer program may be stored in a computer-readable recording medium to perform the method of detecting abnormal behavior of process equipment when connected to a computer which is hardware.

Other details of the present disclosure are provided in the detailed description and drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 3 is a flowchart of a method of identifying abnormal behavior of process equipment according to an embodiment of the present disclosure;

DETAILED DESCRIPTION OF EXEMPLARY EMBODIMENTS

Figure 1:
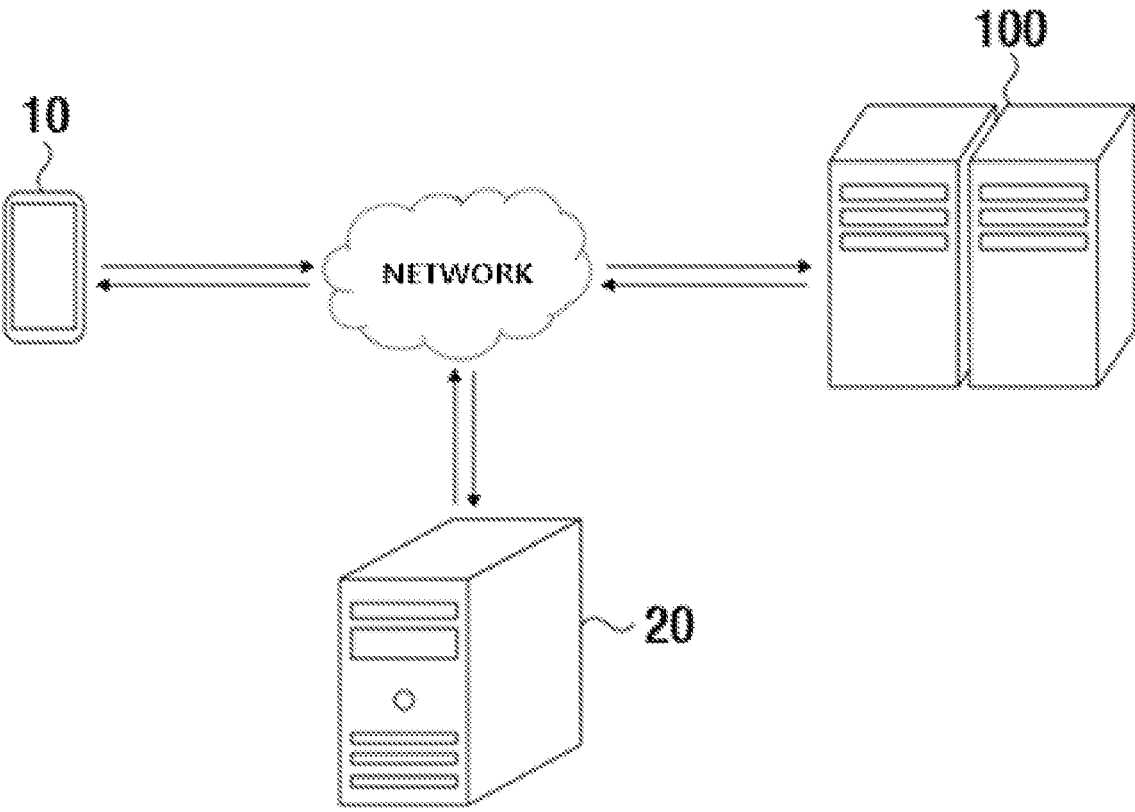
FIG. 1 is a schematic diagram illustrating a system for implementing a method of identifying abnormal behavior of process equipment according to an embodiment of the present disclosure.

Various embodiments will be described with reference to the drawings below. In the present specification, various detailed descriptions are provided to assist the understanding of the present disclosure. However, it will be obvious that these embodiments can be executed without these detailed descriptions.

The terms "component," "module," "system," etc. as used herein indicate computer-related entities, hardware, firmware, software, a combination of software and hardware, or the execution of software. For example, a component may refer to, but is not limited to, a procedure executed by a processor, a processor, an object, a thread of execution, a program, and/or a computer. For example, both an application executed by a computing device and the computing device may be understood as components. One or more components may be included in a processor and/or a thread of execution. One component may be localized in a computer. One component may be distributed between two or more computers. In addition, such components may be executed from various types of computer-readable media in which various data structures stored. The components may communicate with one another through local and/or remote processings, for example, according to a signal with one or more data packets (e.g., data from one component interacting with another component in a local system or a distributed system and/or data transmitted via a signal to other systems through a network such as the Internet).

The term "or" should be understood to mean an inclusive "or" rather than an exclusive "or." That is, unless specified otherwise or specified clearly according to context, "X uses A or B" should be understood to mean one of the natural intrinsic substitutions. That is, "X uses A or B" should be understood to mean that X uses A, X uses B, or X uses both A and B. The term "and/or" as used herein should be understood to indicate and include all possible combinations of one or more items among listed associated items.

The terms "comprise" and/or "comprising" should be understood to mean that characteristics and/or components are present. However, the term "comprise" and/or "comprising" should be understood that the presence or addition of one or more other features, components and/or groups thereof is not excluded. Unless otherwise specified or the context clearly indicates a singular form, a single component described in the present specification and the claims should be understood to mean one or more components.

In addition, it will be understood by those of ordinary skill in the art that various logical blocks, configurations, modules, circuits, means, logics, and operations of an algorithm described in connection with the embodiments set forth herein may be implemented by electronic hardware, computer software, or combinations thereof. To clearly indicate the interchangeability of hardware and software, various components, blocks, configurations, means, logics, modules, circuits, and operations are generally described in terms of functions thereof. Whether such functions are implemented by hardware or software depends on a specific application and design restrictions imposed on the overall system. Experienced technicians will be able to implement functions described herein in various ways for each specific application. However, the decisions of such implementations should not be construed as not falling within the scope of the present disclosure.

A description of the embodiments set forth herein is provided to allow those of ordinary skill in the technical field to which the present disclosure pertains to use or implement the present disclosure. Various modifications to these embodiments will be apparent to those of ordinary skill in the technical field to which the present disclosure pertains. The general principles defined herein are applicable to other embodiments without departing from the scope of the present disclosure. Therefore, the present disclosure is not limited to the embodiments set forth herein. The present disclosure should be interpreted in the widest range consistent with the principles and novel features presented herein.

In the present specification, the term "computer" refers to all types of hardware devices each including at least one processor and may be understood to include a software configuration operated in a hardware device according to an embodiment. For example, a computer may be understood to include, but is not limited to, a smartphone, a tablet personal computer (PC), a desktop computer, a notebook computer, and a user client and an application running on each device.

Hereinafter, embodiments of the present disclosure will be described in detail with reference to the accompanying drawings.

Operations described herein will be described as being performed by a computer, but a subject of each of the operations is not limited thereto and at least some of the operations may be performed by different devices according to an embodiment.

FIG. 1 is a schematic diagram illustrating a system for implementing a method of identifying abnormal behavior of process equipment according to an embodiment of the present disclosure.

As illustrated in FIG. 1, the system for implementing the method of identifying abnormal behavior of process equipment may include a user terminal 10, an external server 20, a computing device 100, and a network. The components shown in FIG. 1 are examples and thus other components may be added or some of the components shown in FIG. 1 may be omitted.

According to embodiments of the present disclosure, various types of wired communication systems such as a public switched telephone network (PSTN), x Digital Subscriber Line (xDSL), Rate Adaptive DSL (RADSL), Multi Rate DSL (MDSL), Very High Speed DSL (VDSL), Universal Asymmetric DSL (UADSL), High Bit Rate DSL (HDSL) and/or local area network (LAN) may be used as the network.

Alternatively, various types of wireless communication systems such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA) and other systems may be used as the network presented herein.

In embodiments of the present disclosure, the network may be configured regardless of whether communication is wired communication or wireless communication, and configured as various types of communication networks such as a Personal Area Network (PAN) and a Wide Area Network (WAN). In addition, the network may be the well-known World Wide Web (WWW) or wireless transmission technology used in short-range communication such as Infrared Data Association (IrDA) or Bluetooth may be employed. The techniques described herein are applicable to not only the above-described networks but also other networks.

According to an embodiment of the present disclosure, the user terminal 10 may be a terminal related to a user (or operator) who accesses the computing device 100 to detect whether an abnormality occurs in an equipment process. For example, the user of the user terminal 10 may be an engineer who manages the quality of a process or wants to analyze big data related to the process. In other words, examples of the user of the user terminal 10 may include an operator or an engineer who detects an abnormal situation during operation of process equipment on the basis of sensing data obtained during the operation of the process equipment. In an embodiment, the user terminal 10 may receive information as to whether abnormal behavior has occurred from the computing device 100. For example, the computing device 100 may detect abnormal behavior, generate abnormal behavior detection information, and transmit the abnormal behavior detection information to the user terminal 10, and the user of the user terminal 10 may recognize that an abnormal situation has occurred in the process on the basis of the abnormal behavior detection information.

The user terminal 10 may be understood as a type of entity(s) in a system with a mechanism for communication with the computing device 100. Examples of the user terminal 10 may include a PC, a notebook computer, a mobile terminal, a smart phone, a tablet PC, a wearable device, and the like, and may include all types of devices capable of accessing a wired/wireless network. Examples of the user terminal 10 may include a server implemented by at least one of an agent, an application programming interface (API), and a plug-in. The user terminal 10 may include an application source and/or a client application.

According to an embodiment of the present disclosure, the external server 20 may be a server that stores process sensor data accumulated for many years and prior knowledge data that correspond to an automated process. For example, the external server 20 may store operating parameters of a wafer manufacturing device in a semiconductor fabrication process and various types of sensor data obtained during operation of the device. For example, the external server 20 may store prior knowledge data related to relationship information between devices. That is, the external server may be a server that stores data related to various processes as big data.

Information stored in the external server 20 may be used as training data for training a neural network according to the present disclosure, verification data, and test data. That is, the external server 20 may be a server that stores information about a data set for training a neural network model according to the present disclosure.

The computing device 100 of the present disclosure may receive process sensor data and prior knowledge data from the external server 20 to construct a training data set, and generate a deep learning model of the present disclosure by training a neural network model including one or more network functions through the training data set.

The external server 20 may be a digital device equipped with a processor and a memory and having computational capability, such as a laptop computer, a notebook computer, a desktop computer, a web pad, and a mobile phone. The external server 20 may be a web server that processes a service. The above-described examples of the external server 20 are only examples, and the present disclosure is not limited thereto.

According to an embodiment of the present disclosure, the computing device 100 that detects abnormal behavior of process equipment (hereinafter, "computing device 100") is capable of detecting the abnormal behavior of process equipment. The computing device 100 may obtain process sensor data obtained in an operation of a process equipment and prior knowledge data corresponding to the process sensor data, and generate reconstruction process sensor data based on the process sensor data and the prior knowledge data. The process sensor data may include various types of sensing data obtained in real time during operation of the process equipment. For example, the process sensor data may include operating parameters of a wafer manufacturing device in a semiconductor fabrication process and various types of sensor data obtained during operation of the device.

More specifically, the computing device 100 may generate reconstruction process sensor data by processing the process sensor data and the prior knowledge data as inputs of a deep learning model. The deep learning model may be a neural network model trained to output an output similar to a specific input. The deep learning model may be pre-trained on the basis of process sensor data for training obtained for many years and prior knowledge data for training. Here, the process sensor data for training, which is used to train the deep learning model, may include only sensor data related to normality. In other words, the process sensor data for training may not include sensor data related to abnormal behavior.

In other words, as the deep learning model may be trained on the basis of data accumulated for many years, when process sensor data similar to the accumulated process sensor data is input to the deep learning model, the deep learning model may output reconstruction process sensor data similar to the input process sensor data, and when process sensor data that is not similar to the accumulated process sensor data is input to the deep learning model, the deep learning model may output reconstruction process sensor data that is not similar to the input process sensor data.

In addition, the computing device 100 may calculate a reconstruction rate error between the process sensor data and the reconstruction process sensor data output to correspond to the process sensor data. Specifically, a reconstruction rate error calculated by the computing device 100 may be large when the difference between process sensor data related to an input and reconstruction process sensor data related to an output is large or may be small when the difference between the process sensor data related to the input and reconstruction process sensor data related to the output is small. That is, the reconstruction rate error may be calculated based on the difference between an input (i.e., process sensor data) and an output (i.e., reconstruction process sensor data) of a deep learning model.

In addition, the computing device 100 may compare a calculated reconstruction rate error with a reference threshold to detect abnormal behavior. In an embodiment, the reference threshold is obtained in a training process of the deep learning model and determined based on a reconstruction rate error related to a largest value among a plurality of reconstruction rate errors related to each of a plurality of pieces of training data. For example, the reference threshold may be determined based on a largest reconstruction rate error among reconstruction rate errors each corresponding to one of 100,000 pieces of process sensor data obtained over the past three years and one of pieces of reconstruction process sensor data corresponding to the pieces of process sensor data. In other words, the reference threshold may be determined based on a reconstruction rate error of the worse restored process sensor data (i.e., process sensor data with a largest reconstruction rate error) among pieces of process sensor data of the past several years. The reference threshold may be used as a criterion for detecting abnormal behavior. In a specific embodiment, the computing device 100 may determine that normal behavior has occurred when a reconstruction rate error is less than or equal to the reference threshold, and determine that abnormal behavior has occurred when the reconstruction rate error is greater than the reference threshold.

In other words, the computing device 100 may generate reconstruction process sensor data on the basis of process sensor data and calculate a reconstruction rate error on the basis of a comparison between the process sensor data and the reconstruction process sensor data. The computing device 100 may compare the reconstruction rate error with the reference threshold, and determine that abnormal behavior has occurred in an equipment process when the reconstruction rate error is greater than the reference threshold. For example, when the process sensor data is similar to pieces of training data used to train a deep learning model (i.e., process sensor data accumulated for many years), a calculated reconstruction rate error may be small. In contrast, when the process sensor data is not similar to the pieces of training data used to train the deep learning model, the calculated reconstruction rate error may be large. In other words, when the reconstruction rate error is greater than a reference threshold calculated based on data accumulated for many years, the computing device 100 may determine that a type of data different from the type of data obtained in a previous normal situation has been generated (i.e., sensor data that has never been detected has been detected) and thus determine that a current state is an abnormal state. A method of training a deep learning model and a method of detecting an abnormal situation will be described in more detail with reference to FIGS. 2 and 9 below.

Figure 2:
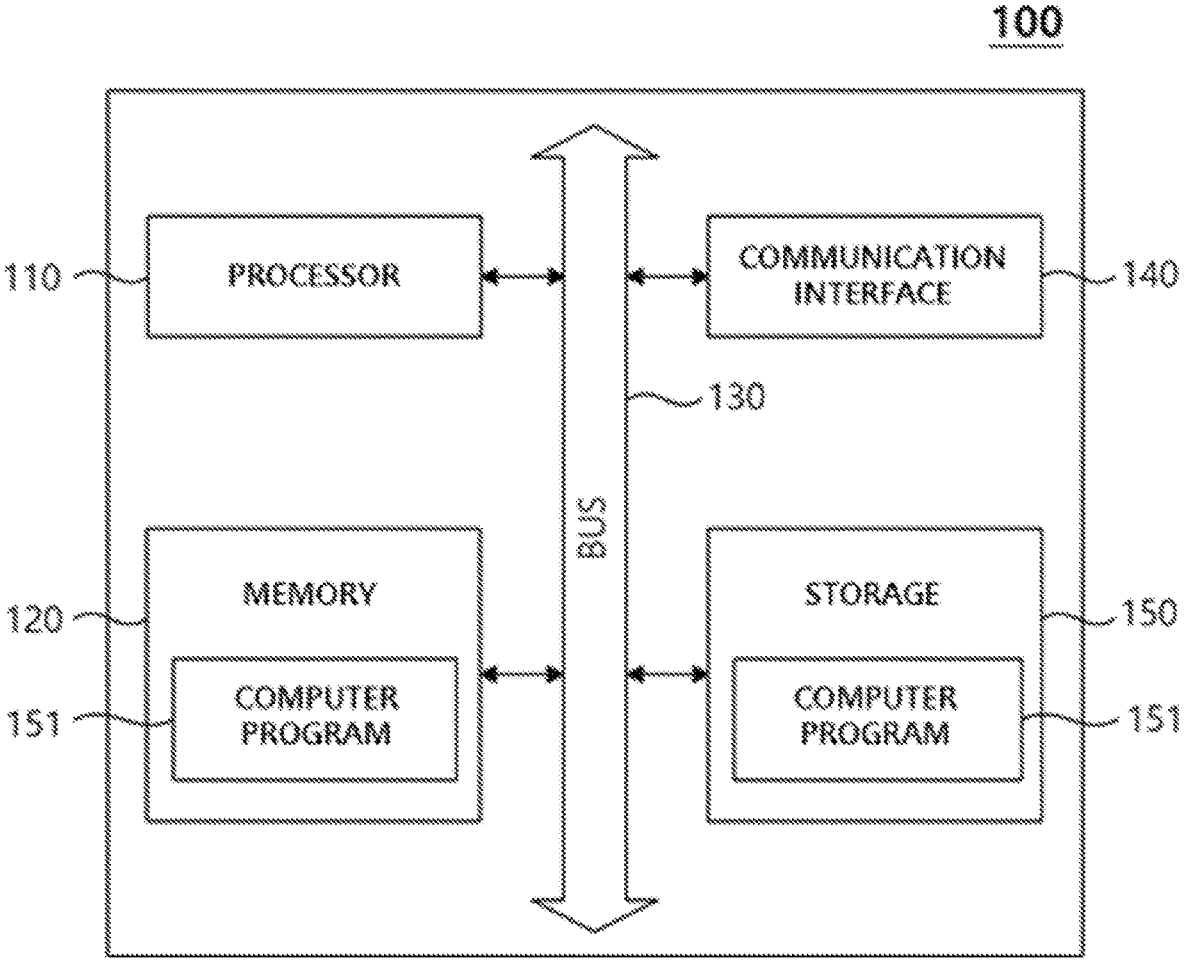
FIG. 2 is a block diagram of a computing device for identifying abnormal behavior of process equipment according to an embodiment of the present disclosure.

FIG. 2 is a block diagram of a computing device for detecting the abnormal behavior of process equipment according to an embodiment of the present disclosure.

Referring to FIG. 2, the computing device 100 according to an embodiment of the present disclosure may include at least one processor 110, a memory 120 into which a computer program 151 executable by the at least one processor 110 is loaded, a bus 130, a communication interface 140, and a storage 150 storing the computer program 151. Here, FIG. 2 illustrates only components related to an embodiment of the present disclosure. Therefore, it will be apparent to those of ordinary skill in the art that other general-purpose components may be further provided, as well as the components illustrated in FIG. 2.

The at least one processor 110 control the overall operation of the computing device 100. The at least one processor 110 may include a central processing unit (CPU), a microprocessor unit (MPU), a micro controller unit (MCU), a graphics processing unit (GPU), or any type of processor well known in the technical field of the present disclosure.

The at least one processor 110 may read a computer program stored in the memory 120 and process data for detecting the abnormal behavior of process equipment according to an embodiment of the present disclosure.

The at least one processor 110 may read the computer program stored in the memory 120 and perform data processing for deep learning according to an embodiment of the present disclosure. According to an embodiment of the present disclosure, the at least one processor 110 may perform an operation of training a neural network. The at least one processor 110 may perform computations for training a neural network, e.g., processing input data for training through deep learning (DL), extracting features from the input data, calculating an error value, and updating a weight of the neural network using backpropagation.

At least one of a CPU, a GPGPU, and a TPU of the at least one processor 110 may process learning of a network function. For example, both the CPU and the GPGPU may process the learning of the network function and data classification using the network function. In an embodiment of the present disclosure, processors of a plurality of computing devices may be used together to perform the learning of the network function and data classification using the network function. A computer program performed by a computing device according to an embodiment of the present disclosure may be a program executable by the CPU, the GPGPU or the TPU.

In the present specification, the network function may be used interchangeably with an artificial neural (AI) network and a neural network. In this specification, the network function may include at least one neural network, and in this case, an output of the network function may be an ensemble of outputs of the at least one neural network.

According to an embodiment of the present disclosure, generally, the at least one processor 110 may process overall operations of the computing device 100. The at least one processor 110 may process signals, data, information, etc. input or output through the above-described components or execute an application program stored in the memory 120 to provide appropriate information or functions to a user or a user terminal or process the information or functions.

The at least one processor 110 may perform an operation on at least one application or program for performing methods according to embodiments of the present disclosure, and the computing device 100 may include at least one processor.

In various embodiments, the at least one processor 110 may further include a random access memory (RAM) (not shown) and a read-only memory (ROM) (not shown) to temporarily and/or permanently store signals (or data) processed in the at least one processor 110. The at least one processor 110 may be in the form of a system-on-chip (SoC) including at least one of a graphics processor, a RAM, and a ROM.

The memory 120 stores various types of data, instructions, and/or information. The memory 120 may load the computer program 151 from the storage 150 to perform methods/operations according to various embodiments of the present disclosure. When the computer program 151 is loaded into the memory 120, the at least one processor 110 may execute one or more instructions constituting the computer program 151 to perform the methods/operations. The memory 120 may be embodied as a volatile memory such as a RAM, but the technical scope of the present disclosure is not limited thereto.

The bus 130 provides a communication function between the components of the computing device 100. The bus 130 may be implemented as one of various types of buses such as an address bus, a data bus, and a control bus.

The communication interface 140 supports wired/wireless Internet communication of the computing device 100. The communication interface 140 may also support various communication methods other than Internet communication. To this end, the communication interface 140 may include a communication module well known in the technical field of the present disclosure. In some embodiments, the communication interface 140 may be omitted.

The storage 150 may store the computer program 151 non-temporarily. When a process of identifying the abnormal behavior of process equipment is performed through the computing device 100, the storage 150 may store various types of information required to provide a process for identifying the abnormal behavior of the process equipment.

The storage 150 may include a non-volatile memory, such as a ROM, an erasable programmable ROM (EPROM), an electrically erasable programmable ROM (EEPROM) or a flash memory, a hard disk, a detachable disk, or any type of computer-readable recording medium well known in the technical field to which the present disclosure pertains.

The computer program 151 may include one or more instructions causing the at least one processor 110 to perform methods/operations according to various embodiments of the present disclosure when the computer program 151 is loaded into the memory 120. That is, the at least one processor 110 may execute the one or more instructions to perform the methods/operations according to various embodiments of the present disclosure.

In an embodiment, the computer program 151 may include one or more instructions causing a method of detecting the abnormal behavior of process equipment to be performed, the method including obtaining process sensor data and prior knowledge data corresponding to the process sensor data, generating reconstruction process sensor data corresponding to the process sensor data using a deep learning model, calculating a reconstruction rate error on the basis of the process sensor data and the reconstruction process sensor data, and detecting abnormal behavior on the basis of a comparison between the reconstruction rate error and a reference threshold.

The operations of the methods or algorithm described above in connection with embodiments of the present disclosure may be implemented directly by hardware, a software module executed by hardware, or a combination of hardware and software. The software module may reside in a RAM, a ROM, an EPROM, an EEPROM, a flash memory, a hard disk, a detachable disk, a CD-ROM, or any form of computer-readable recording medium well known in the technical field to the present disclosure pertains.

Components of the present disclosure may be implemented in the form of a program (or an application) and stored in a medium to be executed in combination with a computer which is hardware. The components of the present disclosure may be implemented by software programming or software elements, and similarly, embodiments may be implemented in a programming or scripting language such as C, C++, Java, or an assembler, including data structures, processes, routines, or various algorithms which are combinations of other programming constructs. Functional aspects may be implemented by an algorithm executable by one or more processors.

FIG. 3 is a flowchart of a method of identifying abnormal behavior of process equipment according to an embodiment of the present disclosure. An order of the operations shown in FIG. 3 may be changed when necessary, and at least one of the operations may be omitted or at least one operation may be added. That is, operations to be described below are only an example of the present disclosure and thus the scope of the present disclosure is not limited thereto.

According to an embodiment of the present disclosure, the computing device 100 may obtain process sensor data and prior knowledge data corresponding to the process sensor data (S110). In an embodiment of the present disclosure, the obtaining of the process sensor data and the prior knowledge data may be receiving or loading process sensor data and prior knowledge data stored in the memory 120. The obtaining of the process sensor data and the prior knowledge data may be receiving or loading from another storage medium, another computing device, or a processing module included in the same computing device through a wired/wireless communication device.

According to an embodiment, the process sensor data may include various types of data obtained at an industrial site.

The process sensor data may include sensor data generated in units of seconds in a process.

For example, hundreds of pieces of sensor data may be generated in units of seconds in production equipment. Semiconductor production equipment includes sensors that detect temperature, pressure, the amounts of injected various chemicals, and the like, and process sensor data may be obtained in real time through the sensors. That is, the process sensor data may be understood as sensor data obtained in real time through a plurality of sensors on the basis of an operation of semiconductor process equipment. The process sensor data may include operating parameters of various types of devices for manufacturing a wafer in a semiconductor fabrication process and various types of sensor data obtained during operation of the devices. Examples of the process sensor data may include, but are not limited to, lot equipment history data from a management execution system (MES), data from an equipment interface data source, processing tool recipes, processing tool test data, probe test data, electrical test data, combined measurement data, diagnostic data, remote diagnostic data, post-processed data, etc.

The prior knowledge data may include information about a relationship between a plurality of sensors. For example, the prior knowledge data may include information regarding a correlation between a first sensor that measures temperature in an operation of a certain process and a second sensor that measures pressure in the same operation during the manufacture of a semiconductor. That is, the prior knowledge data may include information about an effect of data of a certain sensor on data of another sensor in an operation of a certain process, i.e., information about a correlation between the sensors. In an embodiment, the prior knowledge data may be configured in the form of a graph.

The process sensor data and the prior knowledge data may be obtained in a process of production equipment and used to detect abnormal behavior. The abnormal behavior may include various process situations that reduce yield or a situation in which abnormal behavior related to a malfunction of equipment or a defective condition is detected.

According to an embodiment, a semiconductor production process consists of hundreds of production steps and the yield of a produced wafer may be measured through final inspection in a last step. The yield of a wafer may be understood as a ratio of the number of high-quality chips to a total number of chips included in the wafer. For example, when all the chips are normal, the yield of the corresponding wafer may be 100%. In general, when the yield of a wafer is low in a semiconductor process, pieces of process sensor data related to the production of wafers may be analyzed. For example, whether wafers processed through certain equipment has many defects or whether a certain production condition causes many problems may be analyzed on the basis of process sensor data. In hundreds of steps of producing a semiconductor, there is a specific production condition for each step, and the yield of a wafer may decrease when the production condition is not satisfied. For example, although certain equipment may be subject to a condition that a set temperature be reached within a certain time period after a wafer is inserted, the condition may not be satisfied in an actual process and this situation may be identified by process sensor data obtained at a corresponding stage. As described above, it may be very helpful in preventing a decrease in yield by analyzing hundreds of pieces of process sensor data obtained in real time in a process.

In an embodiment, predictive maintenance may be very important in a semiconductor process. Predictive maintenance may be understood as an analysis process of preventing the entire facility from being shut down by identifying an abnormal signal or a defective condition and fixing a defect before equipment fails completely. For example, in the case of a semiconductor process, it is necessary to detect a defect of less than 20 nm on a 300 mm wafer due to an equipment problem and thus it may be very difficult to detect a defect. Owing to the development of technology, line widths of circuits are becoming reduced and thus it may be more difficult to detect defects. As a specific example, a semiconductor process may consist of about 500 processes and about 1,000 measurement steps. When even a minor problem occurs in equipment in such a process, a large loss, e.g., discarding the entire quantity of wafers, may be incurred. In order to prevent such a problem, it may be very important to collect and analyze data generated by process sensors in semiconductor equipment. The computing device 100 of the present disclosure may obtain and analyze process sensor data, which is generated in a semiconductor process, using AI, thus contributing to automatic abnormal behavior detection in the process. When abnormal behavior is detected using AI, it is possible to minimize the time required to detect abnormal data and specify a cause of an abnormal state on the basis of process sensor data according to complicated equipment, thereby providing convenience to operators.

According to an embodiment of the present disclosure, the computing device 100 may generate reconstruction process sensor data corresponding to process sensor data by using a deep learning model (S120).

In an embodiment, the deep learning model may be a neural network model that outputs an output similar to an input. The deep learning model may include an auto encoder that outputs output data similar to input data. The auto encoder may include a dimension reduction network function (e.g., an encoder) and a dimension restoration network function (e.g., a decoder).

According to an embodiment, the auto encoder may include at least one hidden layer, and an odd number of hidden layers may be disposed between input and output layers. The number of nodes of each layer may be reduced from the number of nodes of an input layer to the number of nodes of a bottleneck layer (encoding), i.e., an intermediate layer, and expanded, symmetrically with the reduction, from the number of nodes of the bottleneck layer to the number of nodes of an output layer (symmetric to the input layer). Nodes of a dimension reduction layer and nodes of a dimension restoration layer may or may not be symmetrical to each other. The auto encoder may perform nonlinear dimension reduction. The number of input layers and the number of output layers may correspond to the number of sensors remaining after input data is preprocessed. In a structure of the auto encoder, the number of nodes of a hidden layer included in the auto encoder may decrease as the distance between the hidden layer and the input layer increases. When the number of nodes of the bottleneck layer (a layer having a smallest number of nodes and located between the encoder and a decoder) is too small, a sufficient amount of information cannot be transmitted and thus the number of nodes of the bottleneck layer may be maintained to be greater than or equal to a certain number (e.g., half or more of the number of input layers).

Figure 4:
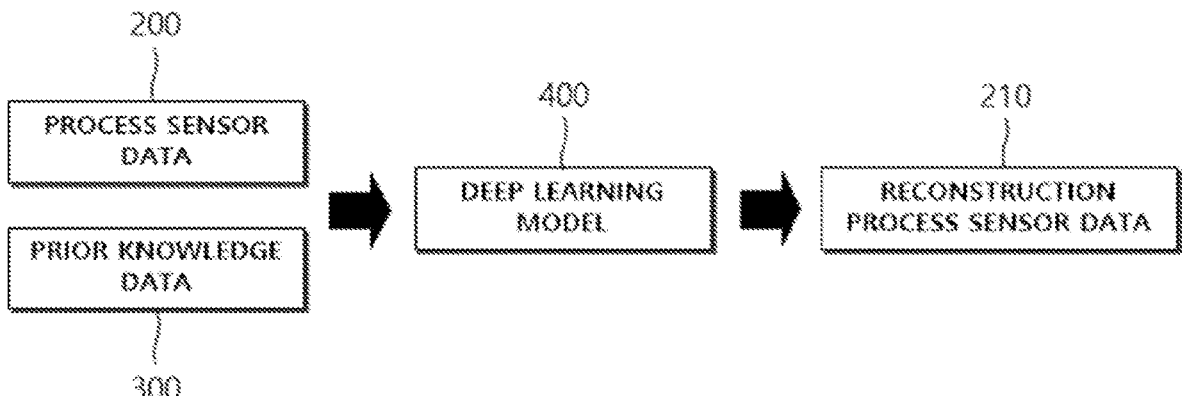
FIG. 4 is a diagram illustrating a deep learning model for generating reconstruction process sensor data using process sensor data and prior knowledge data according to an embodiment of the present disclosure.

Specifically, referring to FIG. 4, a deep learning model 400 may generate reconstruction process sensor data 210 on the basis of process sensor data 200 and prior knowledge data 300 corresponding to the process sensor data 200. The computing device 100 may process the process sensor data 200 and the prior knowledge data 300 as inputs of the deep learning model 400 to output the reconstruction process sensor data 210. A deep learning model is a model trained to output an output similar to a specific input, and reconstruction process sensor data output from the deep learning model may be similar to the input process sensor data. According to an embodiment, the computing device 100 may generate a deep learning model by training the deep learning model with a dimension reduction network function and a dimension restoration network function related to an auto encoder.

The deep learning model may be generated by learning one or more network functions using a training data set including multiple pieces of process sensor data for training and prior knowledge data corresponding to the multiple pieces of process sensor data.

In an embodiment, multiple pieces of process sensor data for training, which are to be used to train a deep learning model, may include pieces of sensor data related to normal behavior excluding pieces of sensor data related to abnormal behavior. The multiple pieces of process sensor data for training may include pieces of process sensor data related to a normal state among process sensor data accumulated for many years.

Figure 5:
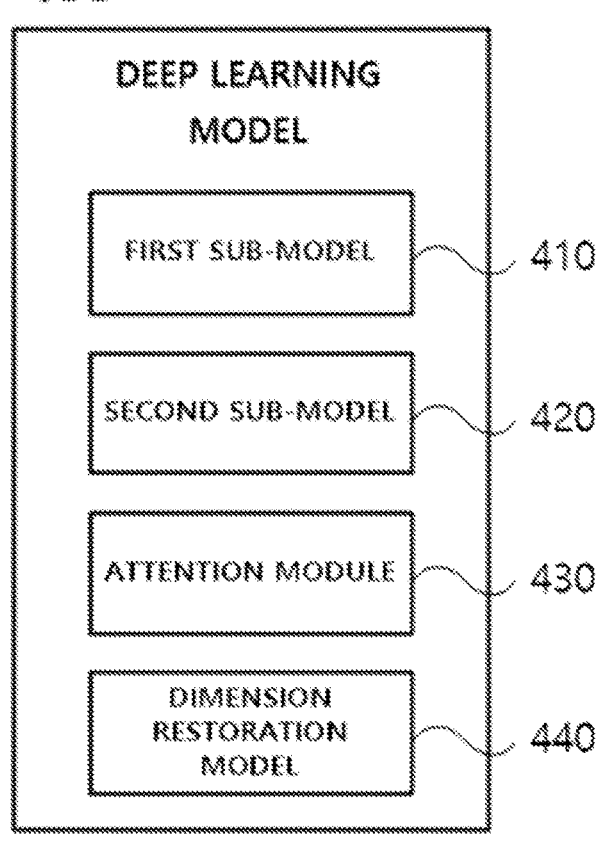
FIG. 5 is a block diagram of a deep learning model according to an embodiment of the present disclosure.
Figure 6:
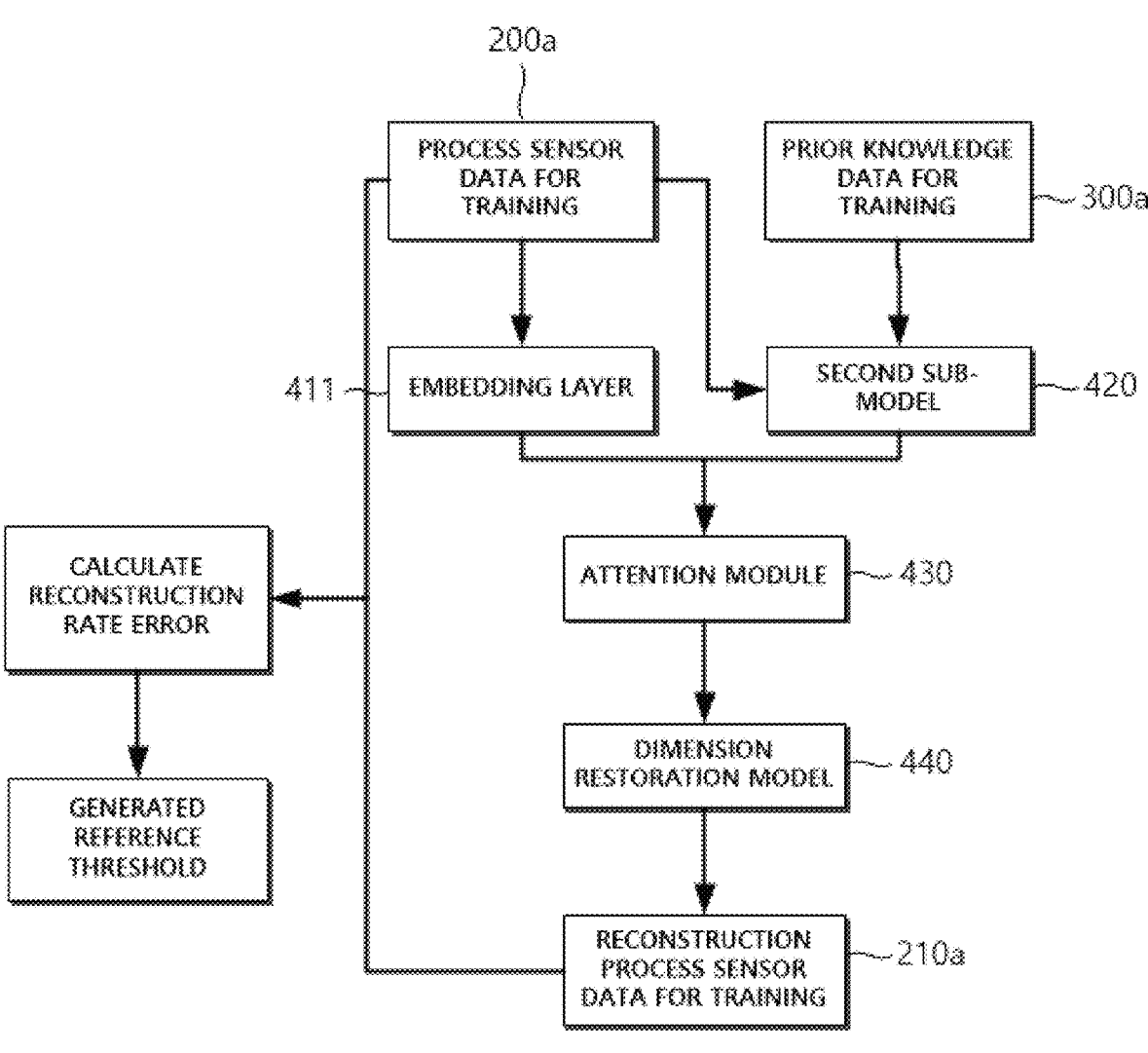
FIG. 6 is a diagram illustrating a training method of a deep learning model and a process of generating a reference threshold according to an embodiment of the present disclosure.

As shown in FIGS. 5 and 6, the deep learning model 400 may include a first sub-model 410, a second sub-model 420, an attention module 430, and a dimension restoration model 440.

According to an embodiment, the computing device 100 may learn one or more network functions using a plurality of training data sets to generate the deep learning model 400 of the present disclosure. The plurality of training data sets may include a plurality of pieces of process sensor data 200a for training and a plurality of pieces of prior knowledge data 300a for training, each corresponding to one of the pieces of process sensor data for training. In an embodiment, the deep learning model may be implemented through at least a part of the auto encoder. For example, the deep learning model may be generated through a training process of the auto encoder. The computing device 100 may train the auto encoder to output data similar to input data.

More specifically, referring to FIG. 6, the computing device 100 may process the plurality of pieces of process sensor data 200a for training as an input of an embedding layer 411 and output vectors corresponding to each piece of process sensor data. The embedding layer 411 may embed a vector corresponding to process sensor data when the process sensor data is input thereto. The embedding layer 411 may perform embedding to correspond to each sensor to which process sensor data is input. For example, the embedding layer 411 may allocate first sensor data related to operation of a first sensor to a first vector and second sensor data related to operation of a second sensor to a second vector. That is, the embedding layer 411 may randomly embed various types of process sensor data.

The embedding layer 411 may randomly embed a vector corresponding to each of a plurality of pieces of process sensor data for training in relation to initial learning, and feature information of training data may be stored in a corresponding vector space during a training process using pieces of training data.

The second sub-model 420 may be a graph neural network (GNN) model that analyzes data related to a dynamic graph structure that changes over time to extract relationship information. The GNN model may be a neural network model that analyzes graph-structured data. The graph structure may be a data structure consisting of two components, i.e., nodes and edges. A graph G may be a set of nodes connected by edges having directionality or no directionality. In an embodiment, the nodes may be sensor data obtained from various types of sensors on a plurality of regions of semiconductor process equipment, and the edges may represent a relationship between the sensors. Because a graph allows an abstract concept, such as an interaction, to be easily represented and a complex matter to be simplified into simpler representation or expressed from different perspectives, the GNN model may be very useful for analyzing data representing a relationship or an interaction. The GNN model is a neural network that may directly act on a graph structure and model a correlation between nodes. That is, the GNN model may model a relationship between nodes of a graph and generate a representation of the relationship.

The second sub-model 420 may output interrelationship information when the prior knowledge data 300a for training is input thereto. The interrelationship information may include information about a relationship between pieces of sensor data. For example, the interrelationship information may be graph network information about a relationship connecting various types of sensor data. In an embodiment, the second sub-model 420 may output interrelationship information between pieces of process sensor data when the process sensor data 200a for training and the prior knowledge data 300a for training are input thereto. For example, the prior knowledge data may not include information about an interaction relationship related to all pieces of sensor data. Accordingly, information about a relationship, which is not included in prior knowledge information, may be extracted from process sensor data using both the process sensor data and the prior knowledge information.

In an embodiment, the attention module 430 may combine a vector randomly assigned through the embedding layer 411 with interrelationship information related to an output of the second sub-model 420, and the dimension restoration model 440 may restore the data combined through the attention module 430 to generate reconstruction process sensor data 210a for training. Training may be performed by backpropagation such that a difference between the process sensor data 200a for training and the reconstruction process sensor data 210a for training decreases and thus feature information may be stored in a feature space corresponding to each piece of process sensor data for training.

The attention module 430 may generate relationship information between time steps of the first sub-model 410 and the second sub-model 420 to combine outputs related to the same time step. For example, the attention module 430 may generate relationship information between a feature output from the first sub-model 410 and interrelationship information output from the second sub-model 420. The attention module 430 may generate information about an interaction relationship that is most related to the feature output from the first sub-model 410. That is, relationship information about interrelationship information having an effect during the outputting of a feature corresponds to process sensor data from the first sub-model 410, i.e., an interaction relationship to be focused on during the outputting of the feature, may be generated to generate feature information from a combination of the feature and the interrelationship information. The attention module 430 may generate feature information by putting emphasis on an interaction relationship to be focused on during the outputting of the feature on the basis of relationship information between an output of the first sub-model 410 and an output of the second sub-model 420.

According to an embodiment, the deep learning model 400 may include the dimension restoration model 440 that restores feature information to generate reconstruction process sensor data. The dimension restoration model 440 may output the reconstruction process sensor data 210a for training when feature information is input thereto. In an embodiment, in a decoding process using the second sub-model 420, data output from a hidden layer may be an approximation of input data (i.e., process sensor data) rather than a perfect copy value. In an embodiment, the dimension restoration model 440 may be configured through a dimension restoration network function (i.e., a decoder) in a trained auto encoder. That is, the dimension restoration network model may output reconstruction process sensor data related to a feature (i.e., feature information) obtained through combining by the attention module 430 when the feature is input thereto.

As described above, a vector randomly assigned to each piece of process sensor data for training through the embedding layer 411 at an initial stage may be updated in a learning process and thus feature information of pieces of sensor data may be stored in the vector.

Accordingly, the trained deep learning model 400 may generate the reconstruction process sensor data 210 when the process sensor data 200 and the prior knowledge data 300 corresponding to the process sensor data 200 are input thereto.

Figure 7:
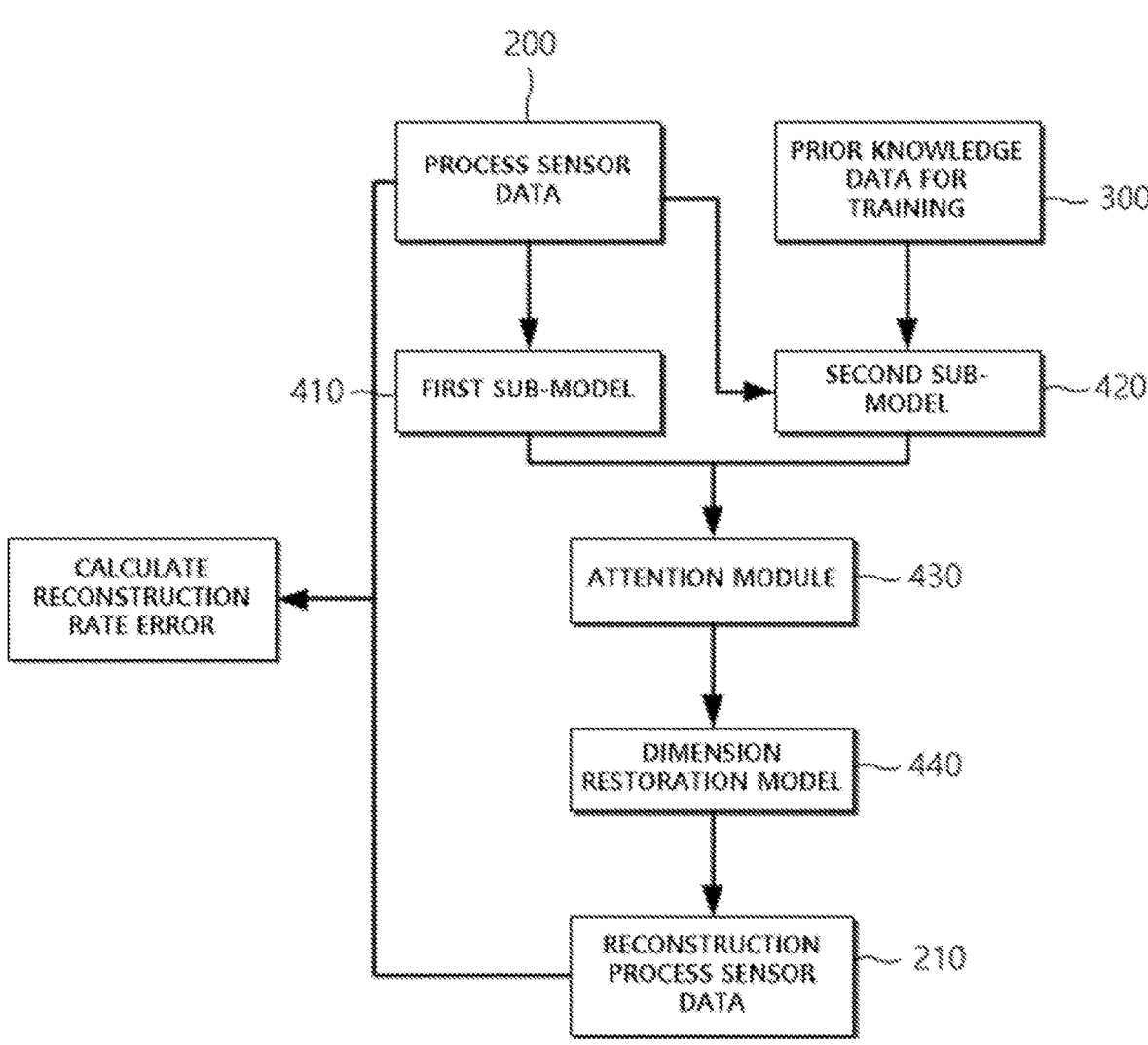
FIG. 7 is a diagram illustrating a process of calculating a reconstruction rate error, corresponding to process sensor data obtained in real time, using a deep learning model according to an embodiment of the present disclosure.

More specifically, referring to FIG. 7, process sensor data 200 obtained in real time may be processed as an input of a first sub-model 410. In this case, the first sub-model 410 may be generated on the basis of a vector including feature information of each piece of process sensor data for training during the above-described training process. For example, a vector randomly assigned to each piece of process sensor data at an initial learning stage may be updated in a learning process in which backpropagation is performed to make an input and an output similar to each other and thus feature information of sensor data is included in the vector. That is, the first sub-model 410 may be trained with feature information related to previous process sensor data (i.e., process sensor data for training) and thus may receive process sensor data generated in real time and output feature information corresponding to the process sensor data.

In addition, the second sub-model 420 may extract interrelationship information between pieces of process sensor data on the basis of the process sensor data 200 and the prior knowledge data 300.

The attention module 430 may generate feature information by combining outputs of the first sub-model 410 and the second sub-model 420, and the dimension restoration model 440 may generate reconstruction process sensor data to restore feature information. That is, the deep learning model 400 may be trained with features of process sensor data classified as normal and thus may generate reconstruction process sensor data similar to process sensor data obtained in real time.

According to an embodiment of the present disclosure, the computing device 100 may calculate a reconstruction rate error on the basis of the process sensor data and the reconstruction process sensor data (S130). Specifically, a reconstruction rate error calculated by the computing device 100 may be large when the difference between process sensor data related to an input and reconstruction process sensor data related to an output is large or may be small when the difference between the process sensor data related to the input and reconstruction process sensor data related to the output is small. That is, the reconstruction rate error may be calculated based on the difference between an input (i.e., process sensor data) and an output (i.e., reconstruction process sensor data) of a deep learning model.

According to an embodiment of the present disclosure, the computing device 100 may detect abnormal behavior on the basis of a comparison between the reconstruction rate error and a reference threshold (S140).

The reference threshold may be obtained based on a reconstruction rate error related to a maximum value among a plurality of reconstruction rate errors related to a plurality of pieces of training data in a training process of a deep learning model using the plurality of pieces of training data.

In an embodiment, the reference threshold is obtained in a training process of the deep learning model and determined based on a reconstruction rate error related to a largest value among a plurality of reconstruction rate errors related to each of a plurality of pieces of training data. For example, the reference threshold may be determined based on a largest reconstruction rate error among reconstruction rate errors each corresponding to one of 100,000 pieces of process sensor data obtained in the past three years and one of pieces of reconstruction process sensor data corresponding to the pieces of process sensor data. As a specific example, referring to FIG. 6, as each of the plurality of pieces of process sensor data 200a for training may be processed as an input of the embedding layer 411, a plurality of vectors corresponding to the pieces of process sensor data 200a may be output. As each of the plurality of pieces of prior knowledge data 300a is processed as an input of the second sub-model 420, a plurality of pieces of interrelationship information may be output. Here, the plurality of pieces of process sensor data 200a for training and the plurality of pieces of prior knowledge data 300a may be process sensor data that is related to normality and accumulated for many years.

The attention module 430 may generate a plurality of pieces of feature information by combining a plurality of vectors and a plurality of pieces of interrelationship information, and the dimension restoration model 440 may receive the plurality of pieces of feature information and generate a plurality of pieces of reconstruction process sensor data 210a for training. In this case, the computing device 100 may compare the plurality of pieces of process sensor data 200a with the plurality of pieces of reconstruction process sensor data 210a to calculate a reconstruction rate error corresponding to each of the pieces of process sensor data 200a. For example, first process sensor data for training and first reconstruction process sensor data for training may be compared with each other to calculate a reconstruction rate error corresponding to the first process sensor data. Similarly, reconstruction rate errors corresponding to the plurality of pieces of process sensor data for training may be generated. The computing device 100 may determine a reference threshold on the basis of a reconstruction rate error related to a maximum value among the reconstruction rate errors corresponding to the plurality of pieces of process sensor data for training.

In other words, the reference threshold may be determined on the basis of the worse restored process sensor data (i.e., process sensor data with a largest reconstruction rate error) among pieces of process sensor data accumulated for the past several years. The reference threshold may be used as a criterion for detecting abnormal behavior.

Figure 8:
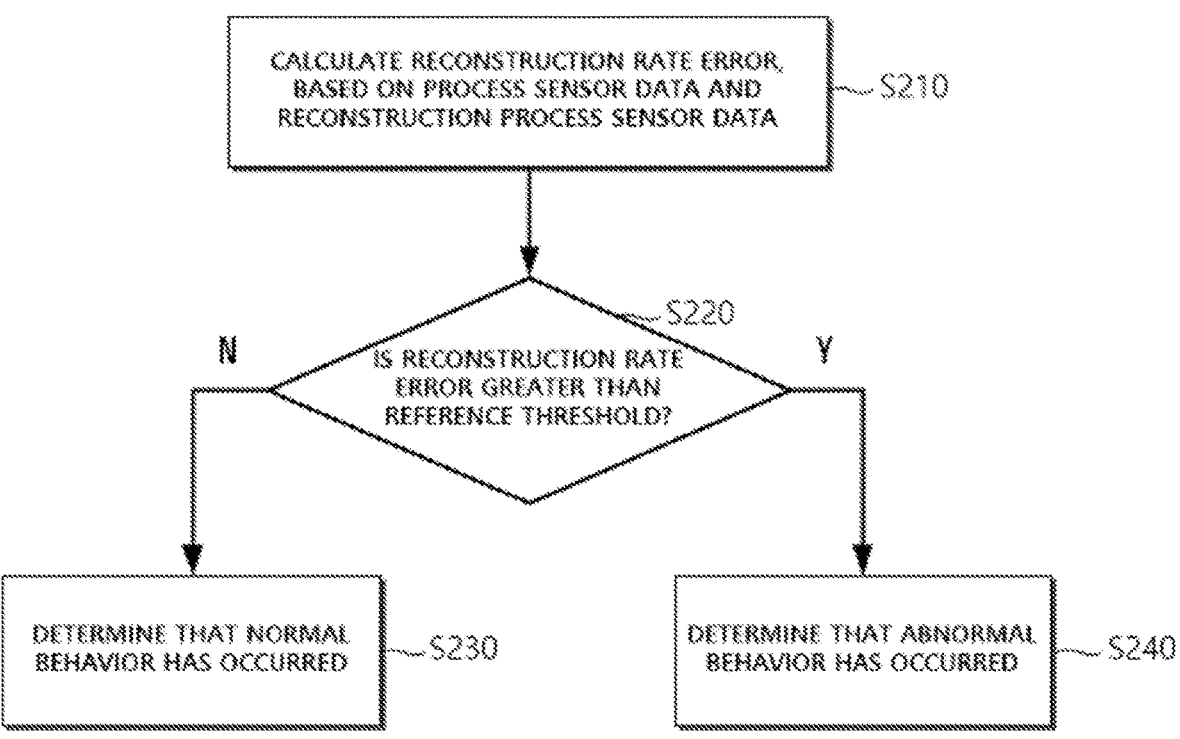
FIG. 8 is a diagram illustrating a process of detecting abnormal behavior on the basis of process sensor data and reconstruction process sensor data according to an embodiment of the present disclosure.

In an embodiment, the computing device 100 may detect abnormal behavior on the basis of a reconstruction rate error calculated according to process sensor data. Specifically, referring to FIG. 8, the computing device 100 may calculate a reconstruction rate error on the basis of process sensor data and reconstruction process sensor data (S210). In addition, the computing device 100 may compare the calculated reconstruction rate error with a reference threshold. The computing device 100 may identify whether the reconstruction rate error is greater than the reference threshold (S220). The computing device 100 may determine that normal behavior has occurred when the reconstruction rate error is not greater than the reference threshold (when the reconstruction rate error is equal to or less than the reference threshold) (S230). The computing device 100 may determine that abnormal behavior has occurred when the reconstruction rate error is greater than the reference threshold (S240).

More specifically, the deep learning model 400 is a neural network model trained based on data accumulated over many years (i.e., pieces of process sensor data obtained through normal behavior in previous processes), and thus, when process sensor data similar to existing process sensor data is input to the deep learning model 400, the deep learning model 400 may output reconstruction process sensor data similar to the input process sensor data and thus a reconstruction rate error may be calculated to be small because the process sensor data and the reconstruction process sensor data are similar to each other. In contrast, when process sensor data that is not similar to the existing process sensor data is input to the deep learning model 400, because the deep learning model 400 has not been trained with the input process sensor data, the likelihood of outputting reconstruction process sensor data that is not similar to the process sensor data. In this case, the process sensor data and the reconstruction process sensor data are not similar to each other and thus a reconstruction rate error may be calculated to be large.

That is, the deep learning model 400 may be trained with features of process sensor data classified as normal and thus is capable of restoring reconstruction process sensor data similar to the process sensor data, and the computing device 100 may determine that abnormal behavior has occurred when it is determined based on the reconstruction rate error that restoration of input data is not successful. More specifically, the computing device 100 may determine that abnormal behavior has occurred when a reconstruction rate error calculated according to process sensor data obtained in real time is greater than a predetermined reference threshold.

As a specific example, 300,000 pieces of process sensor data related to wafer manufacturing processes over the past ten years may be used as training data for training the deep learning model 400. The computing device 100 may determine a reference threshold in advance on the basis of the 300,000 pieces of process sensor data. For example, the reference threshold may be determined in advance on the basis of a reconstruction rate error related to a maximum value among reconstruction rate errors corresponding to the 300,000 pieces of process sensor data.

When process sensor data is obtained in real time in an equipment process, the computing device 100 may generate reconstruction process sensor data on the basis of the process sensor data and prior knowledge data corresponding to the process sensor data, and compare the process sensor data with the reconstruction process sensor data to calculates a reconstruction rate error.

In this case, the computing device 100 may detect abnormal behavior by comparing the reconstruction rate error with the reference threshold. That is, it may be determined that abnormal behavior has occurred, when the calculated reconstruction rate error is greater than a maximum value (i.e., the reference threshold) among the differences between inputs and outputs of a deep learning model that are calculated based on the 300,000 pieces of process sensor data accumulated over the past ten years. In other words, when a reconstruction rate error calculated according to certain process sensor data is greater than a reference threshold calculated based on data accumulated over many years, the computing device 100 may determine that a data type different from a data type obtained in a normal situation has been generated (i.e., that a type of sensor data that has never been experienced in the past has been detected) and thus determine that a current state is an abnormal state.

Figure 9:
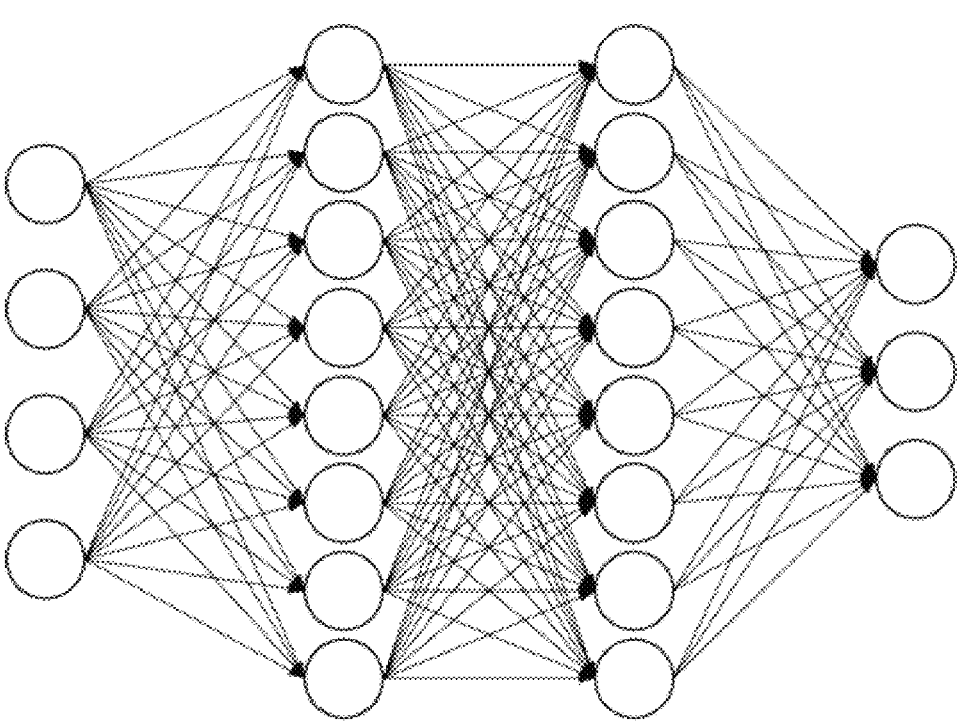
FIG. 9 is a schematic diagram illustrating one or more network functions according to an embodiment of the present disclosure.

FIG. 9 is a schematic diagram illustrating one or more network functions according to an embodiment of the present disclosure.

Throughout the present specification, a computational model, a neural network, a network function, and a neural network may be understood as having the same meaning. The neural network may consist of a set of interconnected computational units that are generally referred to as "nodes." Such "nodes" may be referred to as "neurons."

A deep neural network (DNN) may be understood as a neural network that includes a plurality of hidden layers in addition to an input layer and an output layer. Latent structures in data may be identified using the DNN. That is, latent structures of a photograph, text, video, audio, and music (e.g., an object included in the photo, content and emotion of the text, content and emotion of the voice, etc.) may be identified. Examples of the DNN may include a convolutional neural network (CNN), a recurrent neural network (RNN), an auto encoder, generative adversarial networks (GANs), a restricted Boltzmann machine (RBM), a deep belief network (DBN), a Q-network, a U-network, a Siamese network, etc. The above description of the DNN is only an example and the present disclosure is not limited thereto.

A neural network may be trained by at least one of supervised learning, unsupervised learning, and semi-supervised learning. The neural network is trained to minimize an output error. The training of the neural network is a process of updating a weight of each node of the neural network by repeatedly inputting training data to the neural network, calculating an error between an output of the neural network with respect to the training data and a target value, and back-propagating the error of the neural network from an output layer of the neural network to an input layer to reduce the error. Training data, each piece of which is labeled with a correct answer (i.e., labeled training data), is used for supervised learning, and training data, each piece of which is not labeled with a correct answer, may be used for unsupervised learning. That is, for example, training data, each piece of which is labeled with a category, may be used for supervised learning for data classification. Labeled training data may be input to the neural network, and an error may be calculated by comparing an output (category) of the neural network with a label of the training data. As another example, in the case of unsupervised learning for data classification, input training data may be calculated by comparing an output of the neural network to calculate an error. The calculated error is back-propagated from the neural network in a reverse direction (i.e., in a direction from the output layer to the input layer), and a connection weight of each node of each layer of the neural network may be updated by backpropagation. A rate of change of the connection weight of each node to be updated may be determined according to a learning rate. Calculation of the neural network with respect to input data and backpropagation of an error may constitute a learning cycle (epoch). A learning rate may be applied differently according to the number of repetitions of the learning cycle of the neural network. For example, a high learning rate may be used at an early learning stage of the neural network to quickly achieve a certain level of performance of the neural network to increase efficiency, and a low learning rate may be used at a late learning stage thereof to increase accuracy.

For training the neural network, training data may generally be a subset of real data (i.e., data to be processed using the trained neural network) and thus there may be a learning cycle in which errors in the training data decrease, but errors in the real data increase. Overfitting is a phenomenon in which errors in actual data increase due to excessive learning in training data. For example, a phenomenon in which a neural network that has learned cats while watching a yellow cat cannot recognize a cat other than a yellow cat may be a type of overfitting. Overfitting may act as a cause that increases errors in a machine learning algorithm. Various optimization methods may be used to prevent overfitting. In order to prevent overfitting, methods such as a method of increasing the amount of training data, regularization, or a method of omitting some nodes of a network in a learning process may be applied.

The operations of the methods or algorithm described above in connection with embodiments of the present disclosure may be implemented directly by hardware, a software module executed by hardware, or a combination thereof. The software module may reside in a RAM, a ROM, an EPROM, an EEPROM, a flash memory, a hard disc, a removable disc, a CD-ROM, or any form of computer-readable recording medium well known in the technical field to the present disclosure pertains.

Components of the present disclosure may be implemented in the form of a program (or an application) and stored in a medium to be executed in combination with a computer which is hardware. The components of the present disclosure may be implemented by software programming or software elements, and similarly, embodiments may be implemented in a programming or scripting language such as C, C++, Java, or an assembler, including data structures, processes, routines, or various algorithms which are combinations of other programming constructs. Functional aspects may be implemented by an algorithm executable by one or more processors.

It will be understood by those of ordinary skill in the art that various types of logic blocks, modules, processors, means, circuits, and steps of algorithms described above as examples in relation to the embodiments set forth herein are implementable using electronic hardware, various types of programs or design code (referred to as "software" herein for convenience of description), or a combination thereof. To clearly describe the interoperability between hardware and software, various types of components, blocks, modules, circuits, and steps have been generally described above as examples in relation to functions thereof. Whether such a function is implemented as hardware or software depends on a specific application and design restrictions imposed on the overall system. Experienced technicians will be able to implement functions described herein in various ways for each specific application. However, the decisions of such implementations should not be construed as not falling within the scope of the present disclosure.

The various embodiments set forth herein may be implemented as methods, apparatuses, or articles of manufacture using standard programming and/or engineering techniques. The term "article of manufacture" should be understood to include a computer program, a carrier or media accessible by any computer-readable device. Examples of a computer-readable medium may include, but are not limited to, magnetic storage devices (e.g., a hard disk, a floppy disk, a magnetic strip, etc.), optical discs (e.g., a CD, a DVD, etc.), smart cards, and flash memory devices (e.g., an EEPROM, a card, a stick, a key drive, etc.). In addition, the various types of storage media presented herein include one or more devices for storing information and/or other machine-readable media. The term "machine-readable media" include, but is not limited to, wireless channels and various other media for storing, retaining, and/or transmitting instruction(s) and/or data.

It should be understood that a specific order or hierarchical structure of the operations of the processes introduced herein are only examples of an exemplary approach. It should be understood that a specific order or hierarchical structure of operations of a process may be rearranged within the scope of the present disclosure on the basis of design priorities. The appended method claims provide elements of various operations in a sample order but should not be understood as being limited to the specific order or hierarchical structure presented herein.

According to various embodiments of the present disclosure, sensor process data obtained in time series in a process can be analyzed using AI to detect whether abnormal behavior has occurred in the process.

Effects of the present disclosure are not limited thereto and other effects that are not mentioned herein will be apparent to those of ordinary skill in the art from the above detailed description.

A description of the embodiments set forth herein is provided to allow those of ordinary skill in the technical field to which the present disclosure pertains to use or implement the present disclosure. It will be obvious to those of ordinary skill in the technical field of the present disclosure that various modifications may be made in these embodiments, and the general principles defined herein may be applied to other embodiments without departing from the scope of the present disclosure. Therefore, the present disclosure is not limited to the embodiments set forth herein and should be interpreted in the widest range consistent with the principles and novel features presented herein.

What is claimed is:

1. A method of detecting abnormal behavior of process equipment by one or more processors of a computing device, the method comprising:

obtaining process sensor data and prior knowledge data corresponding to the process sensor data;

generating reconstruction process sensor data, which corresponds to the process sensor data, using a deep learning model;

calculating a reconstruction rate error on the basis of the process sensor data and the reconstruction process sensor data; and detecting abnormal behavior on the basis of a comparison between the reconstruction rate error and a reference threshold, wherein the process sensor data is obtained in real time through a plurality of sensors on the basis of operation of semiconductor process equipment and comprises a plurality of pieces of sensor data related to normal behavior, and the prior knowledge data comprises relationship information between the plurality of sensors, and wherein the deep learning model comprises:

a first sub-model configured to output feature information corresponding to the process sensor data;

a second sub-model configured to extract interrelationship information between pieces of the process sensor data on the basis of the process sensor data and the prior knowledge data;

an attention module configured to generate feature information by combining outputs of the first sub-model and the second sub-model; and a dimension restoration model configured to generate the reconstruction process sensor data by restoring the feature information.

2. The method of claim 1, wherein the deep learning model comprises a neural network model trained to minimize an error between the process sensor data and the reconstruction process sensor data, the neural network model being configured to generate feature information corresponding to the process sensor data, restore the generated feature information, and output the reconstruction process sensor data, when the process sensor data is input thereto.

3. The method of claim 1, wherein the second sub-model comprises a graph neural network (GNN) model configured to analyze data related to a dynamic graph structure that changes over time to extract relationship information.

4. The method of claim 1, wherein the attention module generates relationship information between time steps of the first sub-model and the second sub-model and combines outputs related to the same time step.

5. The method of claim 1, wherein the reference threshold is determined based on a reconstruction rate error related to a maximum value among a plurality of reconstruction rate errors related to a plurality of pieces of training data in a training process of the deep learning model using the plurality of pieces of training data.

6. The method of claim 1, wherein the detecting of the abnormal behavior on the basis of the comparison between the reconstruction rate error and a reference threshold comprises:

determining that normal behavior has occurred when the reconstruction rate error is equal to or less than the reference threshold; and determining that abnormal behavior has occurred when the reconstruction rate error is greater than the reference threshold.

7. An apparatus for performing the method of claim 1, comprising:

a memory storing one or more instructions; and a processor configured to execute the one or more instructions stored in the memory, wherein the processor executes the one or more instructions to perform the method of claim 1.

8. A non-transitory computer-readable recording medium storing a computer program to perform the method of claim 1 when connected to a computer which is hardware.

* * * * *